(12) United States Patent
Moon et al.

(10) Patent No.: US 8,811,012 B2
(45) Date of Patent: Aug. 19, 2014

(54) SLIM-TYPE PORTABLE DEVICE

(75) Inventors: Jung-Nam Moon, Incheon (KR); Sang-In Baek, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 253 days.

(21) Appl. No.: 13/367,627

(22) Filed: Feb. 7, 2012

(65) Prior Publication Data

US 2012/0201414 A1  Aug. 9, 2012

(30) Foreign Application Priority Data

Feb. 8, 2011  (KR) .................. 10-2011-0011270
Apr. 11, 2011  (KR) .................. 10-2011-0033215

(51) Int. Cl.
    *H05K 7/00*  (2006.01)
(52) U.S. Cl.
    USPC ............. 361/679.56; 361/748; 361/679.55; 361/679.3; 455/575.1
(58) Field of Classification Search
    USPC ............. 361/748, 679.55, 679.56, 679.3; 455/575.1
    See application file for complete search history.

(56) References Cited

U.S. PATENT DOCUMENTS

| | | | |
|---|---|---|---|
| 2007/0230096 A1* | 10/2007 | Ryu et al. | 361/679 |
| 2008/0146169 A1* | 6/2008 | Kim et al. | 455/90.3 |
| 2010/0149742 A1* | 6/2010 | Lin et al. | 361/679.09 |
| 2010/0210326 A1* | 8/2010 | Ladouceur et al. | 455/575.3 |
| 2010/0273540 A1* | 10/2010 | Hayashi et al. | 455/575.3 |
| 2011/0185048 A1* | 7/2011 | Yew et al. | 709/221 |

FOREIGN PATENT DOCUMENTS

| | | |
|---|---|---|
| KR | 10-2007-0014942 A | 2/2007 |
| KR | 10-2008-0025615 A | 3/2008 |
| KR | 10-0810267 B1 | 6/2008 |

* cited by examiner

*Primary Examiner* — David M Sinclair
*Assistant Examiner* — Robert Brown
(74) *Attorney, Agent, or Firm* — Cha & Reiter, LLC

(57) ABSTRACT

A slim portable device is provided in which a main body includes a main Printed Circuit Board (PCB), an information Input/Output (I/O) device disposed on the main PCB in parallel relation with the main PCB, an antenna disposed along a partial frontal periphery of the information I/O device, and at least one battery disposed substantially co-planar with the main PCB.

32 Claims, 8 Drawing Sheets

SLIM-TYPE PORTABLE DEVICE

CLAIM OF PRIORITY

This application claims priority under 35 U.S.C. §119(a) to a Korean Patent Application filed in the Korean Intellectual Property Office on Feb. 8, 2011 and assigned Serial No. 10-2011-0011270 and a Korean Patent Application filed in the Korean Intellectual Property Office on Apr. 11, 2011 and assigned Serial No. 10-2011-0033215, the entire contents of both of which are incorporated herein by reference.

BACKGROUND OF THE INVENTION

1. Field of the Invention

The present invention relates to a portable device, and more particularly, to a slim-type portable device such as a smart phone, a tablet PC, etc.

2. Description of the Related Art

In general, the term "portable device" covers a broad range of terminals such as a laptop computer, an MP3 player, a Personal Multimedia Player (PMP), a Personal Digital Assistant (PDA), a smart phone, a tablet PC, etc. Among them, a laptop computer will be taken as an example in the following description.

One type of popular laptop computer includes a display that is folded to or unfolded from a body by means of a hinge. The body includes, on the top surface thereof, an array of keys (i.e. a QWERTY key array) and on the bottom surface thereof, a detachable battery pack. In the body, a keypad is mounted on a main Printed Circuit Board (PCB) and a battery is disposed under the PCB, in a stack structure. Therefore, it is difficult to minimize the thickness of the structure of the keypad, the main PCB, and the battery, thus making it difficult to provide a slim body.

Additionally, when a camera being designed to be used in the body, the image capturing device and the camera lens should be spaced apart from each other by a predetermined distance. Thus, when the camera is installed in a thin body, the camera lens protrudes to a certain thickness from the bottom surface of the body.

The arrangement of such main devices in the body makes it difficult to render the whole laptop computer slim. The same problem faces a tablet PC. That is, the body of the tablet PC is also difficult to make slim.

SUMMARY OF THE INVENTION

An aspect of the present invention is to provide a slim portable device having main interior devices placed at appropriate positions in a body, which facilitate a reduction in thickness of the slim portable device.

Another aspect of the present invention is to provide a slim portable device in which two batteries are arranged in parallel in a body to increase battery capacity and a camera is disposed in an opening between the batteries to maximize the functionality of the camera.

Another aspect of embodiments of the present invention is to provide a slim portable device in which with two connector jacks are fixed to and fully accommodated in two speakers, in order to contribute to a reduction in thickness of a body.

Another aspect of embodiments of the present invention is to provide a slim portable device in which an antenna is disposed at a farthest position from a heat emitter or a metal body in order to improve antenna performance and contribute to a reduction in thickness of a body.

A further aspect of embodiments of the present invention is to provide a slim portable device in which first and second sliding modules are arranged in parallel behind a main PCB and two batteries are arranged in parallel along the width of the main PCB in order to contribute to a reduction in thickness of a body.

In accordance with an embodiment of the present invention, there is provided a slim portable device in which a main body includes a main Printed Circuit Board (PCB), an information Input/Output (I/O) device disposed on the main PCB in parallel to the main PCB, an antenna disposed along a partial frontal periphery of the information I/O device, and at least one battery disposed substantially co-planar with the main PCB.

In accordance with another embodiment of the present invention, there is provided a portable device in which a main body includes a main PCB, an information I/O device is disposed on the main PCB, an antenna is disposed along a partial frontal periphery of the information I/O device, a battery is disposed one and substantially co-planar with the main PCB, and a sliding body one of slides over the main body or slides and then rotates over the main body.

In accordance with another embodiment of the present invention, there is provided a portable device in which a main body includes a first area including a main PCB and an information I/O device on the main PCB, and a second area including at least one battery disposed on and substantially co-planar with the main PCB, and a camera disposed substantially co-planar with the battery. The first and second areas are substantially co-planar with each other.

In accordance with another embodiment of the present invention, there is provided a portable device in which a main body includes a QWERTY key input device, a main PCB, and a battery, a sliding body includes a Liquid Crystal Display (LCD) module and a window on the LCD module, and a sliding module connects the main body to the sliding body. The main PCB is disposed vertically under, and in parallel relation with, the QWERTY key input device, and at least one battery is disposed to be substantially co-planar with the main PCB.

In accordance with another embodiment of the present invention, there is provided a portable device in which a main body includes an information I/O device, at least one battery disposed behind and substantially co-planar with the information I/O device, and a main PCB disposed under and in parallel relation with the information I/O device and in front of and substantially co-planar with the at least one battery.

In accordance with a further embodiment of the present invention, there is provided a portable device in which a first area includes an input device and a main PCB, and a second area includes a battery and at least one hinge module. The first and second areas are substantially co-planar with each other.

BRIEF DESCRIPTION OF THE DRAWINGS

The above features and advantages of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

Figure 1:
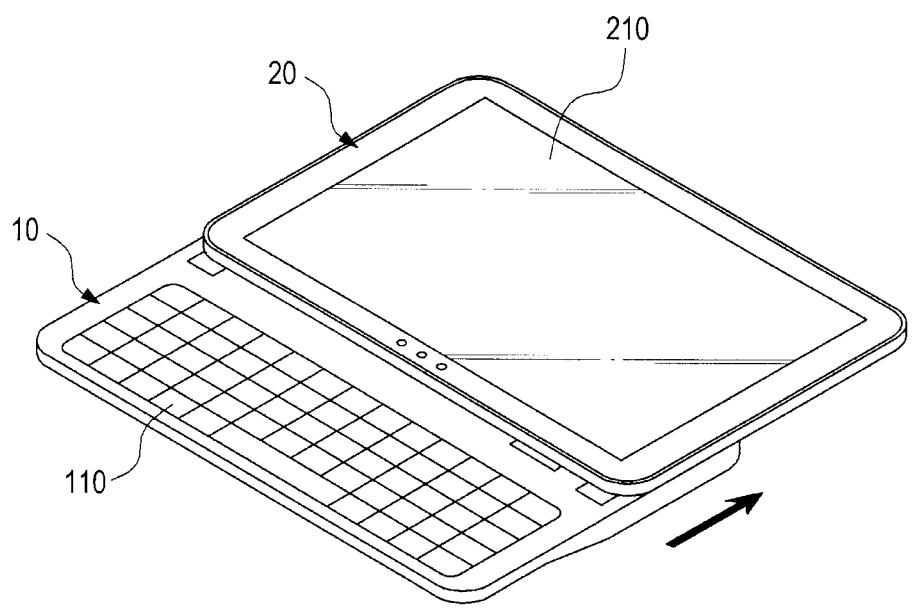
FIG. 1 is a perspective view illustrating the exterior of a slim-type portable device in an open state according to an embodiment of the present invention.

Reference will now be made in detail to the preferred embodiments of the present invention with reference to the accompanying drawings. Like reference numerals denote the same components throughout the specification and the drawings. Detailed descriptions of functions and structures incorporated herein that are well known by those of ordinary skill in the art may be omitted for clarity and simplicity so as to not obscure appreciation of the present invention.

Particular terms may be defined to describe the invention in the best manner. Accordingly, the meaning of specific terms or words used in the specification and the claims should not be limited to the literal or commonly employed sense, but should be construed in accordance with the spirit of the invention as described herein. The description of the various embodiments is to be construed as exemplary and does not describe every possible instance of the invention. Therefore, it should be understood that various changes may be made and equivalents may be substituted for various elements of the invention.

Additionally, the term "substantially" typically means that the recited characteristic, parameter, or value need not be achieved exactly, but that deviations or variations, including for example, tolerances, measurement error, measurement accuracy limitations and other factors known to those of ordinary skill in the art, may occur in amounts that do not preclude the effect the characteristic was intended to provide.

Figure 2:
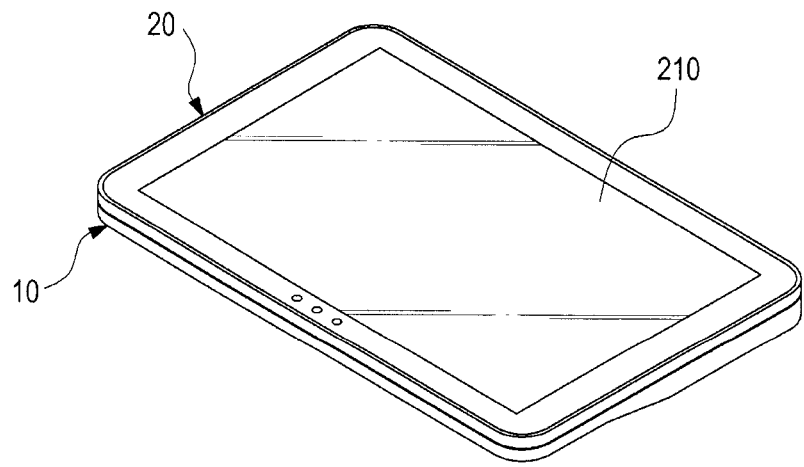
FIG. 2 is a perspective view illustrating the exterior of the slim-type portable device in a closed state according to the embodiment of the present invention.
Figure 3:
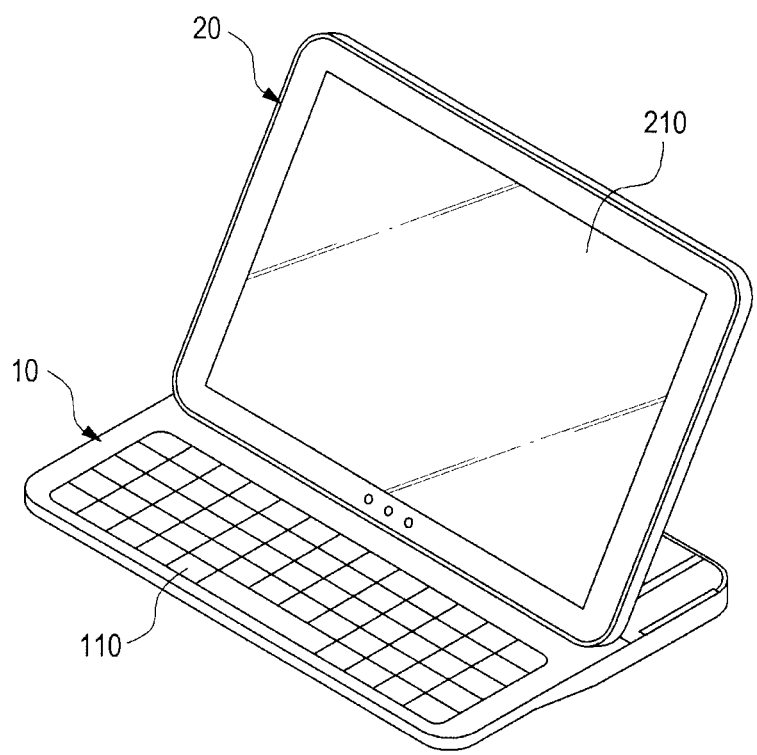
FIG. 3 is a perspective view illustrating the exterior of the slim-type portable device in an inclinedly cradled state according to the embodiment of the present invention.

Referring to FIGS. 1, 2 and 3, the slim-type portable device according to an embodiment of the present invention is configured such that a main body 10 can be rendered slim (that is, slimmed-down) by placing main interior devices at appropriate positions in the main body 10. The term slim-down means slimming down (reducing the thickness) of the main body 10 or eventual slimming down of the portable device.

The portable device is a tablet PC, including the main body 10, a sliding body 20, and sliding modules (i.e. sliding-tilt modules) (illustrated in FIGS. 4, 6, 7 and 10) for engaging the sliding body 20 with the main body 10 in such a manner that the sliding body 20 slides over the main body 10 and then is inclinedly cradled on the main body 10. The sliding body 20 includes an information output device or an information Input/Output (I/O) device. The information output device may be a display including, for example, a display window and a Liquid Crystal Display (LCD) module. The information I/O device may be a touch screen including a touch window 210 and an LCD module (L in FIG. 10). The main body 10 also includes an information input device or an information I/O device. The information input device may be a keypad 110 with a QWERTY key array. The information I/O device may also be a touch screen.

If the information I/O device is provided on a top surface of the main body 10, a user may input intended information by touching the information I/O device.

The sliding body 20 slides toward the rear of the main body 10 in a direction indicted by the arrow, over the top surface of the main body 10 and parallel therewith, thereby opening the information I/O device on the top surface of the main body 10. After opening the information I/O device, the sliding body 20 is permitted to rotate at a predetermined angle by means of the sliding (hinge) modules so as to be inclinedly cradled on the main body 10. The sliding state of the sliding body 20 that has slid for a predetermined distance is illustrated in FIG. 1 and the inclinedly cradled state of the sliding body 20 is illustrated in FIG. 3.

Figure 4:
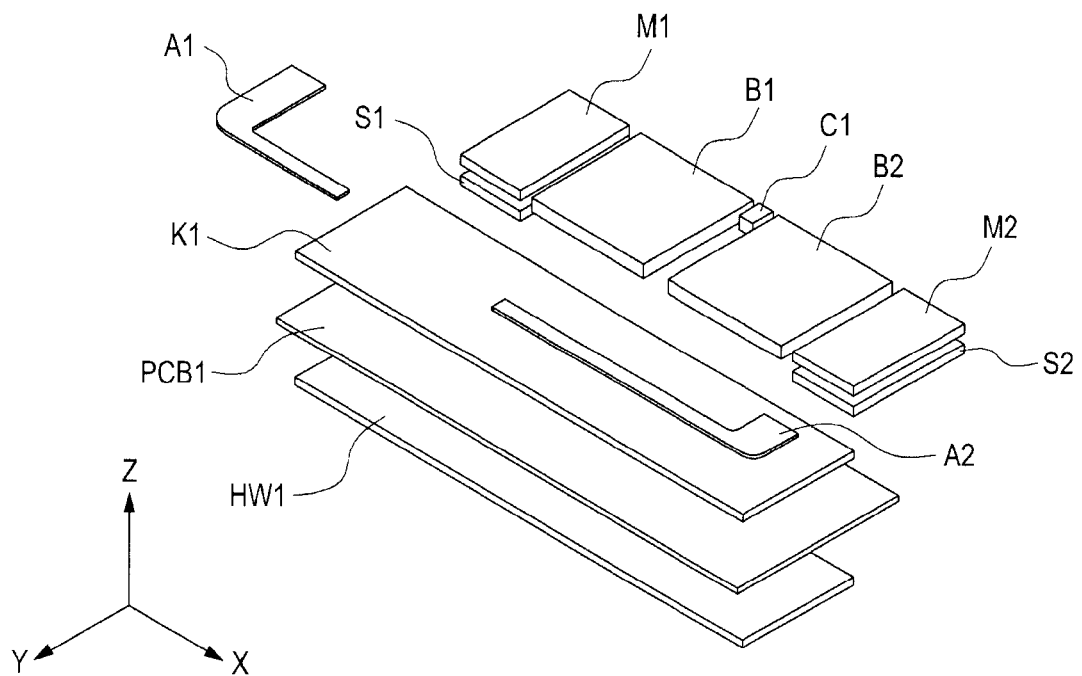
FIG. 4 is an exploded perspective view illustrating arrangement of main devices in a main body of the slim-type portable device according to the embodiment of the present invention.
Figure 5:
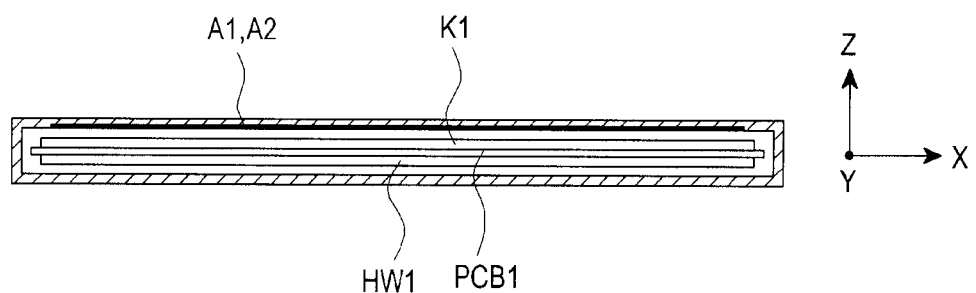
FIG. 5 is a front view illustrating the arrangement of the main devices in the main body of the slim-type portable device according to the embodiment of the present invention.
Figure 6:
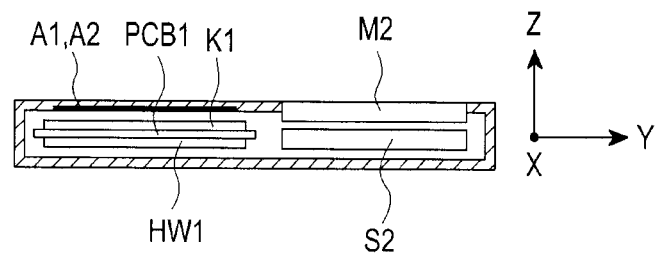
FIG. 6 is a side view illustrating the arrangement of the main devices in the main body of the slim-type portable device according to the embodiment of the present invention.
Figure 7:
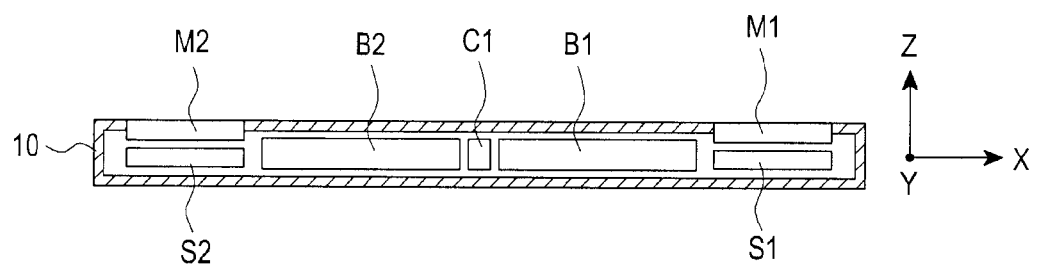
FIG. 7 is a rear view illustrating the arrangement of the main devices in the main body of the slim-type portable device according to the embodiment of the present invention.

With reference to FIGS. 4 to 9, the installation positions of main devices in the main body 10 of the portable device will be described. For the sake of clarity in the description, only the main devices are illustrated in FIG. 4.

In FIGS. 4 to 7, the X axis represents a width direction of the main body 10, that is, sideways, meaning a left or right direction of the main body 10. Specifically, the right and left directions of the main body 10 correspond to the +X and −X axes, respectively. The Y axis represents a length direction of the main body 10, that is, a direction to the front of the main body 10 or a direction to the rear of the main body 10 (i.e. a sliding direction). Specifically, the directions to the front and rear of the main body 10 are represented by the +Y and −Y axes, respectively. The Z axis represents a thickness direction of the main body 10, that is, upward and downward. Specifically, vertical upward and downward directions from the main body 10 are represented by +Z and −Z axes, respectively.

Note, when it is said that the portable device is slimmed down, this implies that the size of the portable device is decreased along the Z axis, not along the X and Y axes.

Figure 8:
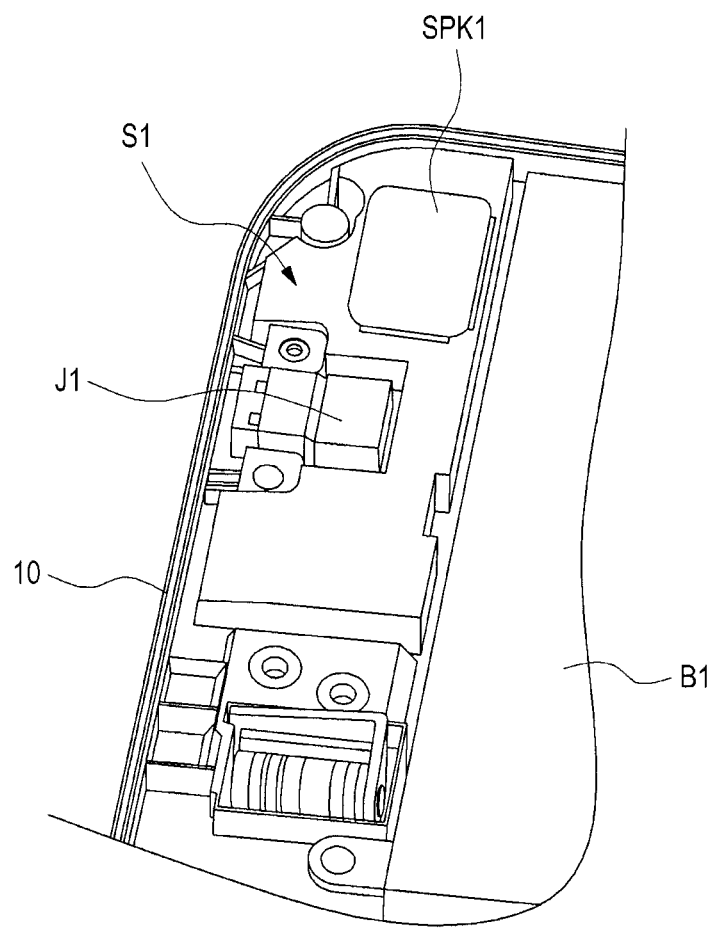
FIG. 8 is a perspective view of a first speaker in the slim-type portable device according to the embodiment of the present invention.
Figure 9:
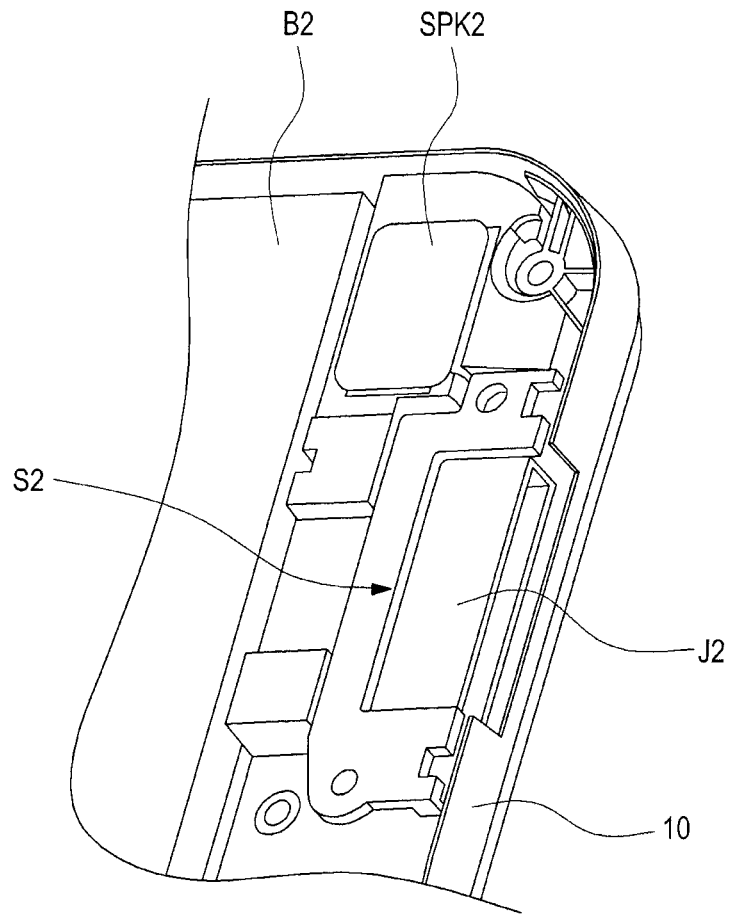
FIG. 9 is a perspective view of a second speaker in the slim-type portable device according to the embodiment of the present invention.

Referring to FIGS. 4 to 7, the main body 10 includes antennas A1 and A2, a main Printed Circuit Board (PCB) PCB1, an information I/O device K1, a hardware part HW1, batteries B1 and B2, a camera C1, first and second sliding modules M1 and M2, and first and second auxiliary modules (S1 and S2 in FIGS. 8 and 9). The antennas A1 and A2, the information I/O device K1, the main PCB PCB1, and the hardware part HW1 are grouped together (as illustrated by the perspective view of FIG. 4 and side view of FIG. 6) so as to be disposed in a first area (the front) of the main body 10, and the batteries B1 and B2, the camera C1, the first and second sliding modules M1 and M2, and the first and second auxiliary modules (S1 and S2 in FIGS. 8 and 9) are grouped together (as illustrated by the perspective view of FIG. 4 and side view of FIG. 6) so as to be disposed in a second area (the rear) of the main body 10. The batteries B1 and B2, the camera C1, and the first and second sliding modules M1 and M2 are arranged substantially in parallel, without being overlapped in the second area of the main body 10. The first and second areas are horizontally parallel to each other, that is, substantially co-planar in the X-Y plane.

The information I/O device K1 is positioned on the main PCB PCB1 and the hardware part HW1 is positioned under the main PCB PCB1. That is, the information I/O device K1 is on a top surface of the main PCB PCB1 and the hardware part HW1 is on a bottom surface of the main PCB PCB1. Thus, the information I/O device K1, the main PCB PCB1, and the hardware part HW1 are stacked top to bottom.

One or more batteries B1 and B2 are arranged substantially in parallel to the main PCB PCB1 in a horizontal direction. The batteries B1 and B2 are disposed behind the main PCB PCB1 in a length (Y axis) direction of the main PCB PCB1. The first battery B1 includes a plurality of battery cells and is electrically connected to the second battery B2. The second battery B2 is positioned co-planar to the first battery B1 at the right side of the first battery B1, along a width (X axis) direction of the first battery B1. The first and second batteries B1 and B2 are paired and assembled into a pack at a predetermined position within the main body 10. The first and second batteries B1 and B2 are of a thin type, symmetrically opposite to each other. Compared to a conventional portable device having a greater thickness as a result of a vertical stack of two batteries, the portable device of the present invention has the first and second batteries B1 and B2 positioned symmetrically in parallel with each other, and thus enables a reduction in thickness of the main body 10.

As a result of the symmetrical positioning of the first and second batteries B1 and B2, an opening is defined therebetween, which in accordance with an aspect of the invention is used for accommodating the camera C1. Thus, the camera C1 is disposed without being overlapped (positioned in a stacked manner) with the first and second batteries B1 and B2. There is a limit on reduction of the thickness of the camera C1 because its image capturing device (not shown) should be spaced apart from its lens (not shown) by a certain distance. Nonetheless, the camera C1 may be fully accommodated in the opening between the batteries and thus in the main body 10, despite the vertical thickness requirements of the camera C1, by providing the camera C1 horizontally parallel to, that is, co-planar with, the first and second batteries B1 and B2. While in the conventional portable device a camera is too thick vertically, that is, along the Z-axis, and thus partially protrudes from the bottom surface of a body, the camera C1 of the present invention may be fully accommodated in the opening between the first and second batteries B1 and B2, thus contributing to reduction of the vertical thickness of the main body 10.

The antennas A1 and A2 are arranged on a partial periphery of the front of the main body 10 along the width direction of the main body 10, that is, along the width direction of the information I/O device K1. The antennas A1 and A2 are disposed along the frontal periphery of the main PCB PCB1. The antenna unit A1 and A2 are two thin antenna elements on a ceiling surface of the front of the main body 10. The antennas A1 and A2 are preferably farthest from a heat emitter, i.e. the batteries B1 and B2, or the main PCB PCB1, or a metal body, i.e. the first and second sliding modules M1 and M2. In general, when an antenna device is near to a heat emitter or a metal body, its antenna performance is degraded. Therefore, it is preferred that the antennas A1 and A2 are arranged along the frontal periphery of the information I/O device K1 (i.e. the frontal periphery of the main PCB PCB1) within the main body 10, particularly on top of the information I/O device K1 since the information I/O device K1 is farthest from the heat emitter or the metal body.

The first and second sliding modules M1 and M2 are shaped into plates, arranged in parallel horizontally along the length direction of the main PCB PCB1 in the rear of the main body 10. The first and second sliding modules M1 and M2 are arranged to be co-planar (along left and right directions) with respect to the width of the batteries B1 and B2. The first and second sliding modules M1 and M2 are symmetrically opposite to each other with respect to the first and second batteries B1 and B2. The first and second sliding modules M1 and M2 guide sliding and rotation of the sliding body (20 in FIG. 2), in engagement with a third sliding module (M3 in FIG. 10) of the sliding body.

The first and second auxiliary modules S1 and S2 are horizontally parallel under the first and second sliding modules M1 and M2, respectively. The first and second auxiliary modules S1 and S2 are peripheral devices serving as accessories, arranged behind the main PCB PCB1 in the length direction of the main PCB PCB1, particularly at both corners of the bottom surface of the rear of the main body 10.

Referring to FIGS. 8 and 9, the first auxiliary module S1 includes a first speaker module SPK1 and the second auxiliary module S2 includes a second speaker module SPK2. The first and second auxiliary modules S1 and S2 are opposite to each other. The first speaker module SPK1 includes a first connector jack J1 and the second speaker module SPK2 includes a second connector jack J2. The first connector jack J1 is integrally fixed to the first speaker module SPK1 in an engaged manner, especially being accommodated fully in the first speaker module SPK1. The first connector jack J1 is an earphone connector jack. The second connector jack J2 is integrally fixed to the second speaker module SPK2 in an engaged manner, especially being accommodated fully in the second speaker module SPK2. The second connector jack J2 is an InterFace (IF) connector jack which is a 30-pin connector jack. The mechanism of accommodating the first and second connector jacks J1 and J2 in the first and second speaker modules SPK1 and SPK2 contributes to slim-down of the main body 10. That is, the first and second speaker modules SPK1 and SPK2 and the first and second connector jacks J1 and J2 are arranged in parallel, rather than they are stacked top to bottom, thereby contributing to slim-down of the main body 10.

Figure 10:
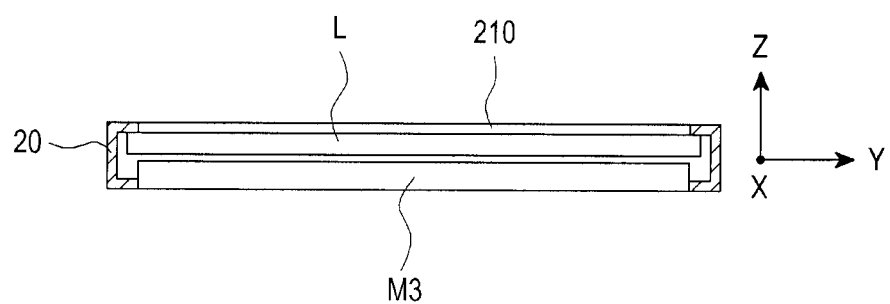
FIG. 10 is a side sectional view of the arrangement of the main devices in the main body of the slim-type portable device according to the embodiment of the present invention.

Referring to FIG. 10, the sliding body 20 includes the window 210, the LCD module L, and the third sliding module M3. The window 210, which is exposed outward, may be a touch window or a display window. The window 210 is disposed on top of the LCD module L and the third sliding module M3 is disposed under the LCD module L. If the window 210 is a touch window, the user may enter intended information by touching the surface of the touch window 210 and the entered information is displayed on the LCD module L. The third sliding module M3 enables sliding and rotation of the sliding body 20, in engagement with the first and second sliding modules (M1 and M2 in FIG. 3).

Consequently, the portable device of the present invention optimizes the installation space utilization of main devices, thereby facilitating slim-down of the main body and thus the sliding-type portable device.

Figure 11:
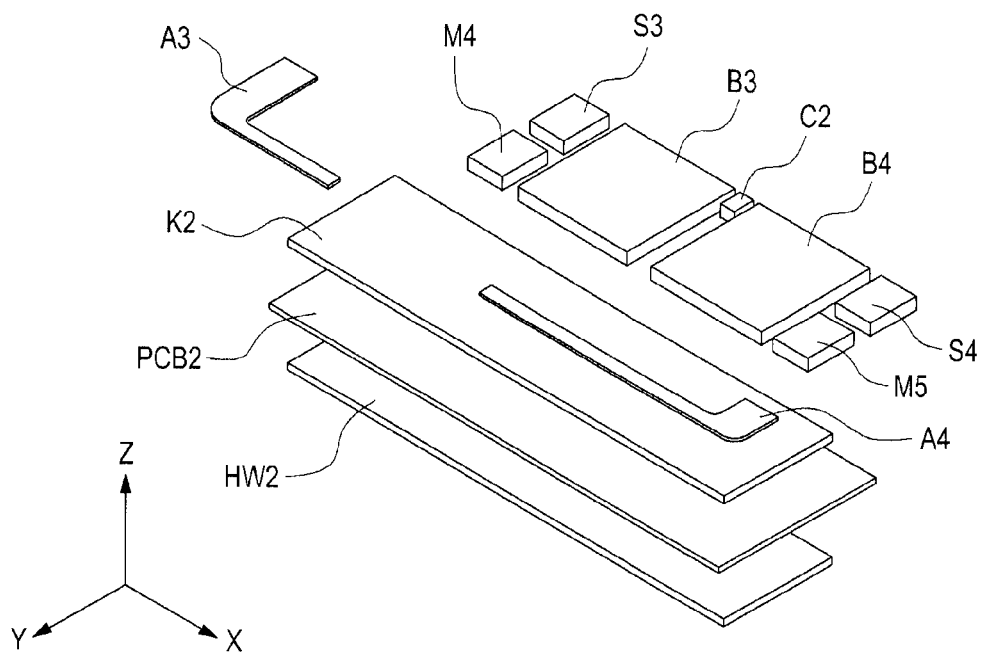
FIG. 11 is an exploded perspective view illustrating arrangement of main devices in a main body of the slim-type portable device according to another embodiment of the present invention.
Figure 12:
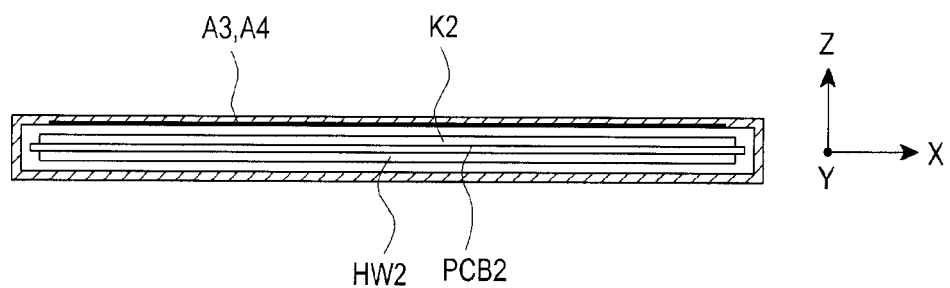
FIG. 12 is a front view illustrating the arrangement of the main devices in the main body of the slim-type portable device illustrated in FIG. 11.
Figure 13:
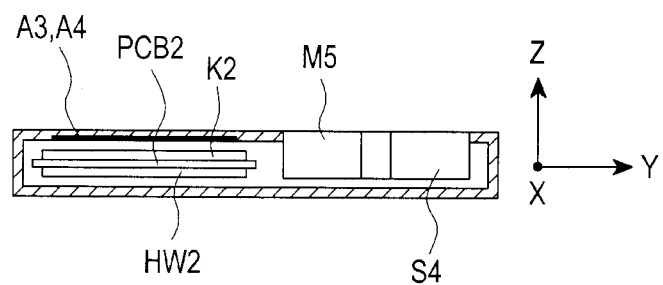
FIG. 13 is a side view illustrating the arrangement of the main devices in the main body of the slim-type portable device illustrated in FIG. 11.
Figure 14:
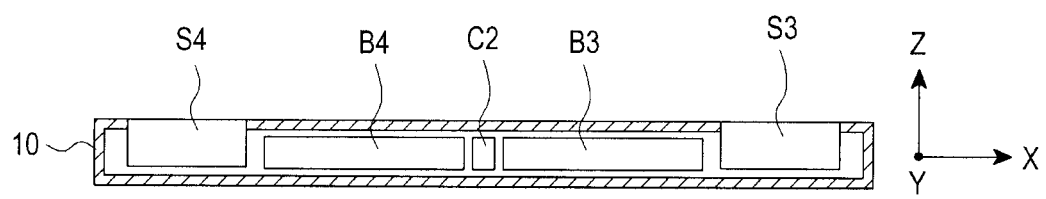
FIG. 14 is a rear view illustrating the arrangement of the main devices in the main body of the slim-type portable device illustrated in FIG. 11.

With reference to FIGS. 11 to 14, the installation positions of main devices in the main body 10 of the portable device according to another embodiment of the present invention will be described. For simplicity of description, only the main devices are illustrated in FIG. 11. In FIGS. 11 to 14, the X, Y and Z axes represent the same directions as in the previous FIGS.

Antennas A3 and A4, a main PCB PCB2, an information I/O device K2, a hardware part HW2, batteries B3 and B4, a camera C2, first and second sliding modules M4 and M5 and first and second auxiliary modules S3 and S4 are included in the main body (10 in FIG. 1). As previously noted, the main body is divided into a first area (its front part) and a second area (its rear) substantially parallel to the first area without being overlapped. The information I/O device K2 and the main PCB PCB2 are grouped together (as illustrated by the perspective view of FIG. 11 and side view of FIG. 13) so as to be disposed in the first area (the front) of the main body 10, and the batteries B3 and B4 and the first and second sliding modules M4 and M5 are disposed in the second area (the rear) of the main body 10. The antennas A3 and A4 and the hardware part HW2 are further disposed in the first area (the front) of the main body 10. The antennas A3 and A4 are arranged along a partial periphery of the first area (the front) of the main body 10. The camera C2 and first and second auxiliary modules S3 and S4 are further arranged substantially co-planar without being overlapped in the second area (the rear) of the main body 10. The camera C2 is disposed so as to be substantially co-planar without being overlapped with the batteries B3 and B4 and the first and second auxiliary modules S3 and S4 are also disposed so as to be substantially co-planar without being overlapped with the batteries B3 and B4 and the first and second sliding modules M4 and M5. Note that this is a substantial deviation from the arrangement shown in FIGS. 4 and 6 where the batteries B1 and B2 and the first and second auxiliary modules S1 and S2 are disposed in an overlapped manner.

More specifically, the information I/O device K2, the main PCB PCB2, and the hardware part HW2 are arranged vertically in parallel (stacked top to bottom) in the first area of the main body 10, while the batteries B3 and B4, the camera C2, the first and second sliding modules M4 and M5, and the first and second auxiliary modules S3 and S4 are all arranged so as to be substantially co-planar, that is, without being overlapped (vertically stacked) with one another, in the second area of the main body 10. As stated before, the first and second areas of the main body 10 are substantially co-planar to each other, that is, without being overlapped. Thus, devices are stacked (overlapped in the vertical direction) in the first area of the main body 10 and devices are arranged substantially co-planar (without being overlapped in the vertical direction) in the second area of the main body 10.

The information I/O device K2 is positioned on the main PCB PCB2 and the hardware part HW2 is positioned under the main PCB PCB2. That is, the information I/O device K2 is on a top surface of the main PCB PCB2 and the hardware part HW2 is on a bottom surface of the main PCB PCB2.

The batteries B3 and B4 are disposed substantially co-planar to the main PCB PCB2 or the information I/O device K2. The batteries B3 and B4 are arranged behind the main PCB PCB2 in the length (Y axis) direction of the main PCB PCB2. One or two batteries B3 and B4 are used herein. The first and second batteries B3 and B4 are arranged co-planar to the main PCB PCB2 without being overlapped with the main PCB PCB2. The first battery B3 includes a plurality of battery cells and is electrically connected to the second battery B4. The second battery B4 is positioned co-planar to the first battery B3 at the right side of the first battery B3, along a width (X axis) direction of the first battery B3. The first and second batteries B3 and B4 are paired and assembled into a pack at a predetermined position within the main body 10. The first and second batteries B3 and B4 are of a thin type, symmetrically opposite to each other. Compared to a conventional portable device having a large thickness due to a vertical stack of two batteries or a battery stacked on a PCB, the portable device of the present invention has the first and second batteries B3 and B4 that are symmetrically parallel to each other, thereby enabling slim-down of the main body 10.

An opening defined between the first and second batteries B3 and B4, is used for accommodating the camera C2. Thus, the camera C2 is disposed co-planar to the first and second batteries B3 and B4 without being overlapped with the first and second batteries B3 and B4. There is a limit on reduction of the thickness of the camera C2 because its image capturing device (not shown) should be spaced apart from its lens (not shown) by a certain distance. Nonetheless, in the present arrangement, the camera C2 may be fully accommodated in the opening and thus in the main body 10 despite its vertical thickness as a result of it being disposed parallel to the first and second batteries B3 and B4. That is, while a camera in the conventional portable device is too thick vertically (that is, along the Z-axis) and thus partially protrudes from the bottom surface of a body, the camera C2 of the present invention may be fully accommodated in the opening between the first and second batteries B3 and B4, thus contributing to reduction of the vertical thickness of the main body 10.

The antennas A3 and A4 are arranged on the frontal periphery (a partial periphery of the first area) of the main body 10 along the width direction of the main body 10. The antennas A3 and A4 are disposed along the frontal periphery of the information I/O device K2. The antennas A3 and A4 are two thin antenna elements disposed on a ceiling surface of the front of the main body 10. The antennas A3 and A4 are preferably farthest from a heat emitter, i.e. the batteries B3 and B4, or the main PCB PCB2, or a metal body, i.e. the first and second sliding modules M4 and M5. In general, when an antenna device is near to a heat emitter or a metal body, its antenna performance is degraded. Therefore, it is preferred that the antennas A3 and A4 are arranged along the frontal periphery of the main body 10 (i.e. the frontal periphery of the information I/O device K2) within the main body 10, particularly on top of a frontal part of the information I/O device K2 because the information I/O device K2 is farthest from the heat emitter or the metal body.

At least one sliding module, herein the first and second sliding modules M4 and M5 are used. They have a tilting (hinge) function, arranged in parallel along the length direction of the main PCB PCB2 behind the main PCB PCB2. The first and second sliding modules M4 and M5 are arranged in parallel without being overlapped at both sides of the batteries B3 and B4 in the width direction of the batteries B3 and B4. The first and second sliding modules M4 and M5 are symmetrically opposite to each other with respect to the first and second batteries B3 and B4. The first and second sliding modules M4 and M5 guide sliding and rotation (hinging) of the sliding body (20 in FIG. 2) and inclinedly cradle the sliding body, in engagement with the third sliding module (M3 in FIG. 10) of the sliding body.

The first and second auxiliary modules S3 and S4 are arranged without being overlapped with the first and second sliding modules M4 and M5 and the batteries B3 and B4. The first and second auxiliary modules S3 and S4 are peripheral devices serving as accessories, behind the main PCB PCB2 or the information I/O device K2 and then behind the first and second sliding modules M4 and M5 at the left and right sides of the batteries B3 and B4. The first auxiliary module S3 includes a first speaker module (not show, but similar to SPK1 shown in FIG. 8) and the second auxiliary module S4 includes a second speaker module (not show, but similar to SPK2 shown in FIG. 9). The first and second auxiliary modules S3 and S4 are opposite to each other. The first and second speaker modules include first and second connector jacks (not shown, but also similar to those illustrated in FIGS. 8 and 9).

The first and second batteries B3 and B4 are arranged in parallel without being overlapped with each other and the first and second sliding modules M4 and M5 are arranged in parallel without being overlapped with the first and second batteries B3 and B4. The first and second auxiliary modules S3 and S4 are also arranged in parallel without being overlapped with each other and without being overlapped with the first and second batteries B3 and B4 and the first and second sliding modules M4 and M5. As clearly shown in FIG. 13, the information I/O device K2, the main PCB PCB2, and the hardware part HW2 are positioned before (that is, in front of) the first and second sliding modules M4 and M5, the first and second auxiliary modules S3 and S4 are positioned behind (that is, to the rear of) the first and second sliding modules M4 and M5, and the first and second batteries B3 and B4 are positioned at the left and right sides of the first and second sliding modules M4 and M5.

Consequently, the main body of the portable device of the present invention is slimmed down since the information I/O device, the main PCB, and the hardware part are stacked top to bottom in the front of the main body and the first and second batteries, the first and second sliding modules, the first and second auxiliary modules, and the camera are arranged substantially co-planar without being overlapped with one another in the rear of the main body.

As is apparent from the above description of the present invention, the main body is slimmed down through optimization of the installation space used by the main devices within the main body. Additionally, from the viewpoint of a user, the overall outward look of the portable device is enhanced and user convenience is also increased.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A portable device comprising:
a main body,
wherein the main body includes a main Printed Circuit Board (PCB);
an information Input/Output (I/O) device disposed on the main PCB in parallel relation to the main PCB;
an antenna disposed along a partial frontal periphery of the information I/O device;
a camera; and
at least one battery disposed substantially co-planar with the main PCB, wherein the at least one battery is arranged to be co-planar with and behind the main PCB in a length direction of the main PCB in a non-stacked relationship, wherein the at least one battery includes a first battery and a second battery arranged in a non-stacked relationship with each other, and wherein the camera is disposed between the first and second batteries and in a co-planar relationship with the first and second batteries.

2. The portable device of claim 1, wherein the first battery and the second battery are arranged to be co-planar with each other along a width direction of the first battery.

3. The portable device of claim 1, wherein a hardware part is disposed under the main PCB so as to be positioned vertically below, and in parallel relation with, the main PCB.

4. The portable device of claim 1, wherein first and second sliding modules are arranged to be co-planar with each other at both sides of the at least one battery.

5. The portable device of claim 4, wherein the first and second sliding modules are arranged to be co-planar with each other behind the main PBC in a length direction of the main PCB and to be co-planar with the at least one battery along a width direction of the at least one battery.

6. The portable device of claim 5, wherein first and second auxiliary modules are arranged under the first and second sliding modules behind the main PCB, so as to be positioned vertically below, and in parallel relation with, the first and second sliding modules.

7. The portable device of claim 6, wherein the first auxiliary module is a first speaker module, a first connector jack is fixed to and fully accommodated in the first speaker module, and the first connector jack is an earphone connector jack.

8. The portable device of claim 6, wherein the second auxiliary module is a second speaker module, a second connector jack is fixed to and fully accommodated in the second speaker module, and the second connector jack is an InterFace (IF) connector jack.

9. The portable device of claim 6, wherein the antenna, the information I/O device, and the main PCB are arranged in a frontal portion of the main body and the at least one battery, the first and second sliding modules, and the first and second auxiliary modules are arranged in a rear portion of the main body.

10. A portable device comprising:
a main body including a main Printed Circuit Board (PCB), an information Input/Output (I/O) device disposed on the main PCB, an antenna disposed along a partial frontal periphery of the information I/O device, and a first battery and a second battery substantially co-planar with the main PCB in a non-stacked relationship; and
a sliding body for one of sliding over the main body or sliding and then rotating over the main body.

11. The portable device of claim 10, wherein the sliding body includes:
a window;
a Liquid Crystal Display (LCD) module under the window; and
a sliding hinge module disposed vertically under, and in parallel relation with, the LCD module.

12. The portable device of claim 11, wherein the window is one of a touch window or a display window.

13. A portable device comprising:
a main body,
wherein the main body includes:
a first area including a main Printed Circuit Board (PCB) and an information Input/Output (I/O) device on the main PCB; and
a second area including at a first battery and a second battery, the first and second batteries being substantially co-planar with the main PCB in a non-overlapping configuration, and a camera disposed substantially co-planar with the first and second battery and being disposed between the first and second batteries, and wherein the first and second areas are disposed so as to be substantially co-planar to each other.

14. The portable device of claim 13, wherein an antenna is disposed along at least a part of the periphery of the first area.

15. The portable device of claim 13, wherein the at least one battery is at least two batteries arranged so as to be substantially co-planar to each other.

16. The portable device of claim 15, wherein the camera is disposed between, and co-planar with, the at least two batteries.

17. A portable device comprising:
a main body including a QWERTY key input device, a main Printed Circuit Board (PCB), and a battery;
a sliding body including a Liquid Crystal Display (LCD) module and a window on the LCD module; and
a sliding module for connecting the main body to the sliding body,
wherein the main PCB is disposed vertically under, and in parallel relation with, the QWERTY key input device, and at least one battery is disposed to be substantially co-planar with the main PCB, the at least one battery including a first battery and a second battery, the PCB and the first and second batteries being in a non-stacked relationship.

18. The portable device of claim 17, wherein the at least one battery is a first battery and a second battery is disposed to be co-planar with the first battery along a width direction of the first battery.

19. The portable device of claim 18, wherein a camera is arranged between, and in co-planar relation with, the first and second batteries, and first and second sliding modules are disposed to be co-planar with the first and second batteries along a width direction of the first and second batteries.

20. The portable device of claim 19, wherein first and second speaker modules are arranged under the first and second sliding modules behind the main PCB, in parallel to the first and second sliding modules, and first and second connector jacks are fully accommodated in, so as to be substantially co-planar with, the first and second speaker modules, respectively.

21. The portable device of claim 17, wherein an antenna is disposed along at least a partial frontal periphery of the QWERTY key input device.

22. A portable device comprising:
a main body,
wherein the main body includes:
an information Input/Output (I/O) device;
at least one battery disposed behind and substantially co-planar with the information I/O device; and
a main Printed Circuit Board (PCB) disposed under and in parallel relation with the information I/O device and in front of and substantially co-planar with the at least one battery, the at least one battery including a first battery and a second battery, the PCB and the first and second batteries being in a non-stacked relationship.

23. The portable device of claim 22, wherein first and second speaker modules are arranged respectively at left and right sides of the at least one battery, so as to be substantially co-planar with the at least one battery.

24. The portable device of claim 23, wherein first and second sliding modules are disposed respectively at the left and right sides of the at least one battery, so as to be to be substantially co-planar with the at least one battery and so as to be to be substantially co-planar with the first and second speaker modules.

25. The portable device of claim 24, wherein the first and second sliding modules are sliding-tilt modules.

26. The portable device of claim 24, wherein the first and second sliding modules are arranged respectively at the left and right sides of the at last one battery behind the information I/O device and in front of the first and second speaker modules.

27. The portable device of claim 24, wherein a camera is arranged so as to be to be substantially co-planar with the at least one battery, substantially co-planar with the first and second sliding modules and substantially co-planar with the first and second speaker modules.

28. A portable device comprising:
a first area including an input device and a main Printed Circuit Board (PCB); and
a second area including a first battery and a second battery and at least one hinge module,
wherein the first and second areas are substantially co-planar with each other, and wherein the first battery and a second battery, and the PCB are positioned in a non-stacked relationship.

29. The portable device of claim 28, wherein an antenna is disposed along at least a part of the periphery of the first area.

30. The portable device of claim 28, wherein the input device and the main PCB are arranged so as to be positioned vertically below, and in parallel relation with each other, and the battery and the at least one hinge module are arranged so as to be substantially co-planar with each other.

31. The portable device of claim 28, further comprising a camera and first and second auxiliary modules which are disposed so as to be substantially co-planar with both of the battery and the at least one hinge module.

32. The portable device of claim 28, wherein the at least one hinge module is a plurality of hinge modules arranged at both sides of the second area.

* * * * *

UNITED STATES PATENT AND TRADEMARK OFFICE
CERTIFICATE OF CORRECTION

PATENT NO.        : 8,811,012 B2
APPLICATION NO.   : 13/367627
DATED             : August 19, 2014
INVENTOR(S)       : Jung-Nam Moon et al.

Page 1 of 1

It is certified that error appears in the above-identified patent and that said Letters Patent is hereby corrected as shown below:

In the Claims:

Column 10, Claim 5, Line 15 should read as follows:
--...the main PCB in...--

Column 12, Claim 24, Lines 10-11 should read as follows:
--...so as to be substantially...--

Column 12, Claim 24, Lines 11-12 should read as follows:
--...so as to be substantially...--

Column 12, Claim 26, Line 18 should read as follows:
--...the at least one...--

Column 12, Claim 27, Line 22 should read as follows:
--...so as to be substantially...--

Signed and Sealed this
Twenty-first Day of October, 2014

Michelle K. Lee
*Deputy Director of the United States Patent and Trademark Office*